(12) United States Patent
Lajeunesse

(10) Patent No.: US 6,591,783 B1
(45) Date of Patent: Jul. 15, 2003

(54) MARINE LIFE PACKAGING AND ACCLIMATIZATION SYSTEM

(76) Inventor: Yves Lajeunesse, 8256 Woodmuir Dr., West Palm Beach, FL (US) 33412

(*) Notice: Subject to any disclaimer, the term of this patent is extended or adjusted under 35 U.S.C. 154(b) by 0 days.

(21) Appl. No.: 10/077,268

(22) Filed: Feb. 15, 2002

(51) Int. Cl.[7] .............................................. A01K 63/02
(52) U.S. Cl. ..................................... 119/203; 119/201
(58) Field of Search ............................... 119/203, 201, 119/200, 215, 234; 43/4, 55

(56) References Cited

U.S. PATENT DOCUMENTS

| | | | | |
|---|---|---|---|---|
| 2,316,607 A | * | 4/1943 | MacDonald | 119/201 |
| 2,652,807 A | * | 9/1953 | Washburn | 119/201 |
| 3,168,887 A | * | 2/1965 | Bodell | 119/201 |
| 4,040,200 A | | 8/1977 | Tomita | 43/57 |
| 4,965,955 A | * | 10/1990 | Campbell et al. | 43/4 |
| 5,165,361 A | | 11/1992 | Beghini | 119/201 |
| 5,218,923 A | * | 6/1993 | LaRosa | 119/251 |

FOREIGN PATENT DOCUMENTS

| | | | |
|---|---|---|---|
| FR | 2755432 | | 5/1998 |
| FR | 2789058 | * | 8/2000 |
| GB | 2054812 A | * | 2/1981 |

OTHER PUBLICATIONS

W00045632A1; FR2789058B1; EP 1148778A1; AU0023003A5.

* cited by examiner

Primary Examiner—Charles T. Jordan
Assistant Examiner—Judith Nelson
(74) Attorney, Agent, or Firm—McHale & Slavin PA

(57) ABSTRACT

A method and apparatus for packaging live fish in sealed containers. A plastic container is partially filled with water, before receipt of fish, with at least some of the air evacuated from the container and replaced with a gas. An air-tight lid is sealed to the container capturing a layer of gas, such as oxygen, in a void over the water. The use of a clear or transparent container and lid, allows the container to operate as a miniature aquarium allowing storage of the fish for an extended period of time. The fish are acclimated to a point-of-use aquarium by weighting of the container for placement in the aquarium. The container includes printed marks for puncture holes to allow the exchange of water between the container and the receiving aquatic environment. The puncture holes permit a predetermined amount of air to escape the container while slowing being displaced by the water of the aquatic environment. The container is designed to sink providing an absolute indicator that fluid admixing is complete. The lid of the container can then be removed allowing the fish to enter their new environment, which is now the same as the water within the container.

12 Claims, 3 Drawing Sheets

MARINE LIFE PACKAGING AND ACCLIMATIZATION SYSTEM

FIELD OF THE INVENTION

This invention is directed to the field of packaging and transporting of aquarium fish and aquatic plants and in particular to a marine life packaging and acclimatization device and method for commercial or consumer use, that permits the shipping of aquarium fish in a sealed container and allows a means for acclimating the packaged fish and plants to a new aquatic environment thereby diminishing or eliminating the risk of shock to the fish.

BACKGROUND OF THE INVENTION

The current method of transporting aquarium fish results in a high percentage of fish lost by death. The losses can be due to improper storage, transportation, or acclimatization. Retail distributors may not be trained in proper storage, wherein over feeding can be as destructive as under feeding. Improper transportation containers may lead to contamination of the water, loss of oxygenated water, or the like leading to health related problems if not loss. The loss of marine life is especially troublesome if the fish are rare or otherwise expensive such is the case with exotic fish. Even if the loss of a common goldfish can be troublesome if the fish was lost by an impressionable child who takes the loss as a personal failure. A common practice for the storage of fish is the use of a retail store located aquarium. Further, a common means for the average consumer to transport fish is by use of a soft plastic bag filled with water. Plastic bags are difficult to handle leading to the possibility of leaks and injury to the fish. Live marine plants are typically sold to the consumer in a similar fashion as the fish, wherein the transportation problem is similar.

The typical aquarium has water which may be of a certain temperature, pH, nitrate, ammonium and other chemical balances. Fish are adaptable to their environment but require time to adjust, or acclimate, to a new environment. For this reason, fish that are taken from a retail store aquarium are packaged with water from their existing environment. A problem occurs when the customer inserts the newly purchased fish into the home aquarium. Sudden exposure of the fish to varied water temperatures and chemical balances often result in shocked, sick fish which consequently result in a large percentage of lost fish. The result can be a dissatisfied customer who blames the retailer for selling bad fish and typically requests a refund. This condition is principally prejudicial due to the fact that exotic fish and plants are quite rare and expensive, and created by a situation outside the control of the retailer. Various methods and devices have been developed in recent years in an attempt to address these problems.

U.S. Pat. No. 5,165,361.A discloses a method and device for the treatment and life preservation of bivalve mullusks outside their natural environment. The device is made of a transparent rigid container closed by a transparent rigid top fitting into the sides of the container. The top is equipped with a valve intended to permit the introduction of a gas of an appropriate composition, after the extraction of the confined air in the container and after the introduction of the mollusks and their conservation liquid. Such method, if eventually would apply to the transportation of fish and live aquatic plants, would not permit the realization of a rigorous initial packaging, and even less to an appropriate acclimatization.

FR Patent 2,755,432.A describes a packaging for live aquatic animals, using a container with water and air, air-tight closed with a top, being distinguished mainly by similar devices by a particular bottom and sides forms. Taking into account the shapes of the aquatic animals being mostly bivalve shellfish, oysters, which can be laid out in one layer without risk of tipping over.

U.S. Pat. No. 4,040,200 discloses a container, being a kind of portable fish tank, intended essentially to maintain live fish used for fishing or restocking of fish, so that they retain their vivacity. This includes a reusable top with two holes and associated plugs, permitting the water oxygenation and the simultaneous aspiration of the enclosed air between the water surface and the top, with the help of a device fixed to the exterior side of the container. Large diameter piping is provided at the base of the container, to allow the pouring out of part or all of the contents, after opening one plug in the top.

Family patents, WO0045632A1, FR2789058B1, EP 1148778A1 and AU0023003A5 disclose an invention consisting of a hard plastic tray sealed with a transparent plastic film, wherein have been previously introduced the fish or aquatic plants and water. On the sealing film there is indicated the site for perforating two orifices for respectively passing through a drip tab and the discharge of an overflow during the slow acclimatization phase at the end of which the content of the tray is poured into an aquarium after the sealing film has been removed. This invention requires for the acclimatization process, a device made of a supple piping, one extremity joined to a diving tube in the fish tank water and the other extremity is inserted, with the intermediary of a faucet, in the container through one of the holes pierced in the film. The water flow from the fish tank to the container is made by gravity in placing each container below the water level of the fish tank. The invention provides an awkward, cumbersome, and potentially sloppy method for transferring existing water to the container during the acclimatization process.

Thus, what is lacking in the art is the ability to ship live fish and plants in individual containers which easily lend themselves to neat, clean, spill free portability, packaging and transportation, the same of which is used by the packager through the retailer and through to, and including, the end user consumer allowing the customer to progressively acclimate the fish directly within the new aquatic environment.

SUMMARY OF THE INVENTION

The instant invention provides a method for packaging marine life such as live fish, seaweed, coral, plants, and the like in sealed containers. In the preferred embodiment, a plastic container is employed having an open top. The container is partially filled with water, before receipt of fish, coral, aquatic plants or the like and either sealed if used for short term storage, or placed inside an air evacuation chamber that flushes, or evacuates, air from the container and replaces the air with a gas such as oxygen. An air-tight lid is sealed to the container capturing a layer of the gas in a void over the water. The sealed container protects the fish during transportation, prevents contamination of the water, and the oxygen provides sufficient air permeation with the water to allow the fish to survive for an extended period of time. Food may be placed within the container before shipping, such as a slow release tablet, also providing extended storage of the fish. Insertion of clean water, or filtered water and removal of contaminated air reduces or eliminates bacterial growth and associated discoloration of water.

The use of a clear, transparent, or opaque container and lid, or film cover, allows the storage device to further operate a miniature aquarium. The container may include display items such as a sea chest, gravel, and so forth.

The container is further used to acclimate the fish to a point-of-use aquarium, fish at farms, wholesalers and retailers. A weight may be formed integral with the container, shipped within or attached to the container, secured to the container by the consumer at the moment of acclimatization, or the use of a weight to force down the container. The integral weight may consist of a decorative item such as a ceramic figure, hardened time-release fish food, sand, or simply a non-decorative solid weight. Alternatively, the consumer may insert a weight such as coins, at the moment of acclimatization.

The container includes printed marks for puncture holes to allow the exchange of water between the container and the receiving aquatic environment. Weights included in the package are arranged so as to allow gravity to pull on the container, however, the puncture holes permit a predetermined amount of air to escape the container while slowing being displaced by the water of the aquatic environment. The container is designed to sink providing an absolute indicator that fluid admixing is complete. The lid of the container can then be opened or removed allowing the fish to enter their new environment, which is now the same as the water within the container.

Thus, an objective of the invention is to provide a safe, clean and practical method of temporarily storing live fish and aquatic plants.

Still another objective of the invention is to provide a container that protects the fish from contamination during shipping and temporary storage.

Yet still another objective of the invention is to provide a container which may be utilized by the retailer for display purposes.

Another objective of the invention is to disclose a method of acclimatization to the receiving aquatic environment with respect to the aquatic environment's water temperature and chemical composition.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
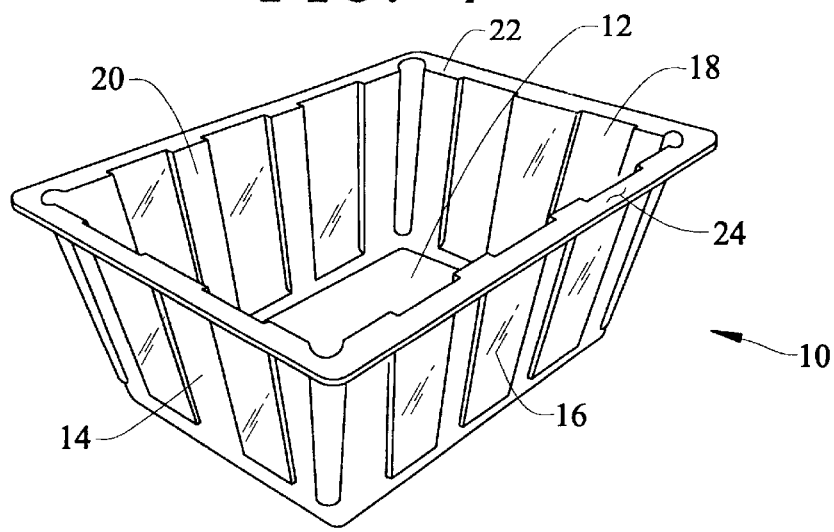
FIG. 1 is a perspective view of the base container of the instant invention.
Figure 2:
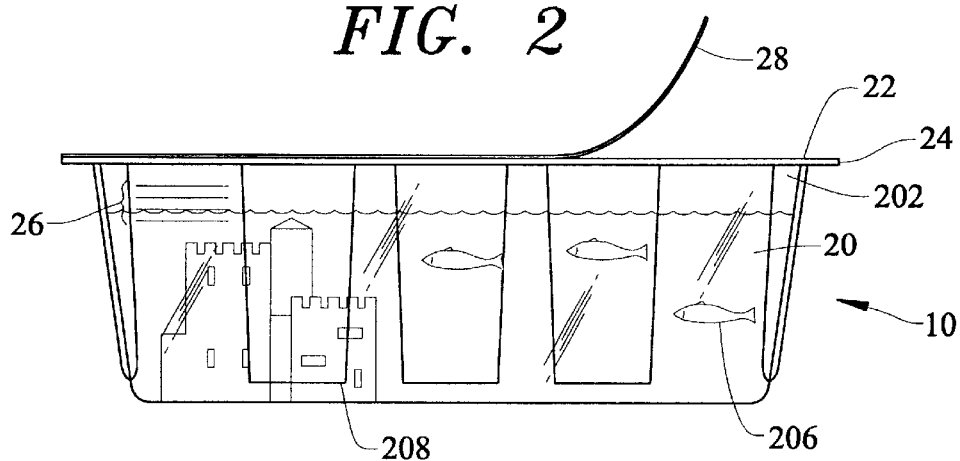
FIG. 2 a pictorial side view of the invention.

Referring now to FIGS. 1 and 2, the instant invention provides a method for packaging live fish in sealed containers. In the preferred embodiment, a plastic container 10 is employed as a base, the container having a bottom wall 12, side walls 14,16,18,& 20, leaving an open top 22 having a lip 24 sized to allow a lip to be secured thereto. The container 10 is partial filled with water 200 leaving a void 202 between the water and the open top 22, the container may include guide marks 26 to indicate a level of filling. Depending on the condition of the water, filtration and/or chemical balancing may be required. Once the container is partial filled with water 200 and filled with fish 206, structures 208, coral and aquatic plants or the like, not shown, and then sealed by a flexible lid 28. A rigid lid may be substituted for a flexible lid. If the container is used for short term storage, the lid can be sealed without an exchange of air. If the container is used for long term storage, the container is placed inside an air evacuation chamber, not shown. The chamber is used to flush or evacuate air from the container. The flushed or evacuated air is replaced with a gas such as oxygen. When the lid is sealed to the container, a layer of oxygen is captured in the void over the water. Preferably the lid is a transparent plastic film, which, when attached to said container, ensures an air-tight closing of the container. Alternatively the lid may be a rigid or semi rigid material, each of which allows for the sealing of the container.

The container may have multiple compartments which may be sealed individually with different atmospheric conditions to accommodate the needs of various fish or plant life. The sealed container not only protects the fish during transportation but further prevents contamination of the water. In addition, the blanket of oxygen provides sufficient air permeation with the water to allow the fish to survive over 30 days. Food may also be placed within the container before shipping, such as a slow release tablet, also providing extended storage of the fish. Insertion of clean water, or filtered water and removal of contaminated air reduces or eliminates bacterial growth and associated discoloration of water.

The use of a clear, transparent, or opaque container 10 and lid allows the storage device to further operate a miniature aquarium. The container may include display items such as a sea chest, gravel, and so forth which further act as weights required for the acclimatization process, to be described in detail later in this application.

Figure 5:
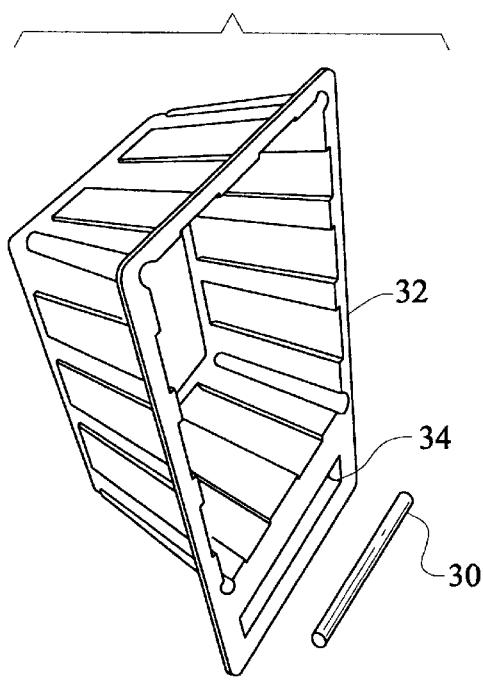
FIG. 5 is a perspective view of the base container having a pressed food embodiment.
Figure 6:
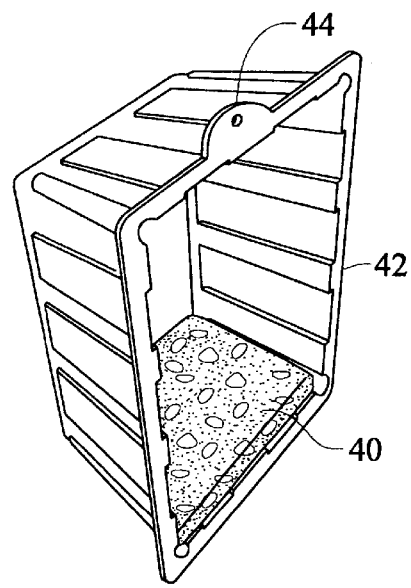
FIG. 6 is a perspective view of the base container having an aquatic base embodiment.
Figure 7:
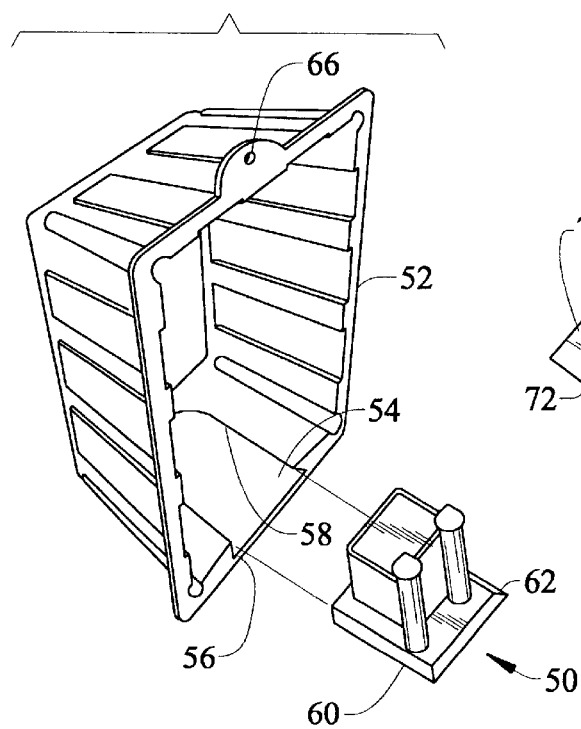
FIG. 7 is a perspective view of the base container having an interior secured ornament embodiment.
Figure 8:
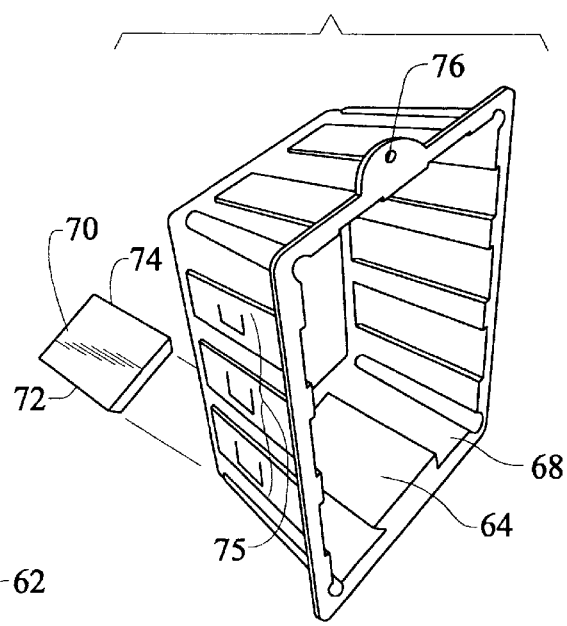
FIG. 8 is a perspective view of the base container having an exterior secured weight embodiment.

As shown in FIGS. 5, a weight 30 may be integrated into the container 32 by the creation of a pocket 34 allowing the weight to be secured by the lid. The weight 34 may be constructed of compressed fish food, sand, gravel, or any other object that may or may not be used in the aquarium setting but provides weight to the container. FIG. 6 depicts the placement of a weight such as a sand/gravel mixture 40 inside the container 42. The sand/gravel mixture provides a habitat for the fish while in storage and further operates as a decorative display. In this manner, the container may be stored in an upright position, as shown, or by use of a container hook 44 placed on holding pegs. FIG. 7 depicts the placement of a weight, such as an aquarium castle 50 positioned into the container 52 and held in position by reciprocal slots 54. The lid, not shown, is used to lock the castle 50 in position together with angular sides 56 and 58 which engage angled edges 60 and 62. A container hook 66 may be used to hold the container on a projecting peg. As shown in FIG. 8, the slot 64 may be formed on the outer surface of side wall 68. In this embodiment a weighted object 70, such as a ceramic weight, having angled edges 72 and 74 are used to engage the side walls of the slot 64 for securing the weighted object 70 in position. A container hook 76 may be used to hold the container on a projecting peg.

Figure 3:
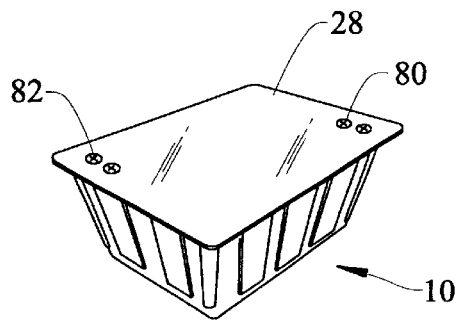
FIG. 3 is a top plane view of the puncher hole embodiment.
Figure 4:
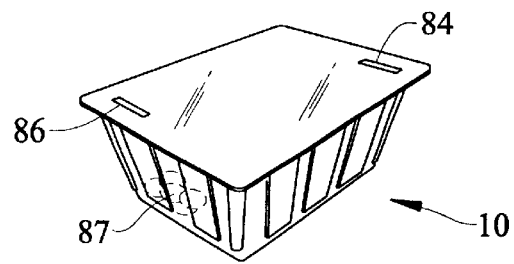
FIG. 4 is a top plane view of the coin slot hole embodiment.

The acclimatization step occurs at the consumers point-of-use wherein the container is inserted into the consumers aquarium. Referring to FIGS. 3, the container includes printed marks 80 and 82 that provide puncture hole locations. To allow for the exchange of water between the container and the receiving aquatic environment, the above mentioned weights are included in the package and arranged so as to allow gravity to pull on the container. The puncture holes 80 permit a predetermined amount of air to escape through puncture holes 82 by slowing being displaced by the water of the aquatic environment. This exchange rate, predetermined by the puncture hole size and weight, provides admixing of the fluids at a rate suitable to acclimatization wherein the fluid temperature slowing changes and chemical balances slowly changes leaving the fish to adjust to their new environment without fear of shock. In an alternative embodiment as shown in FIG. 4, the puncture holes may consist of slots 84 and 86. In this embodiment, items may be inserted into the container such as coins, pebbles, sand or the like to provide weight to the container. Coins 87 are depicted within the container to illustrate one embodiment of the weighting process.

Further, one or more sides of the container may include notches or slots where weighted objects can be snapped to the side of the container. In this embodiment, quarters or similar sized tokens are snapped onto the container. After the coins or tokens are positioned, the holes are punctured and the container placed into the aquarium wherein the attached weights help sink the container by slow displacement of container air.

Figure 9:
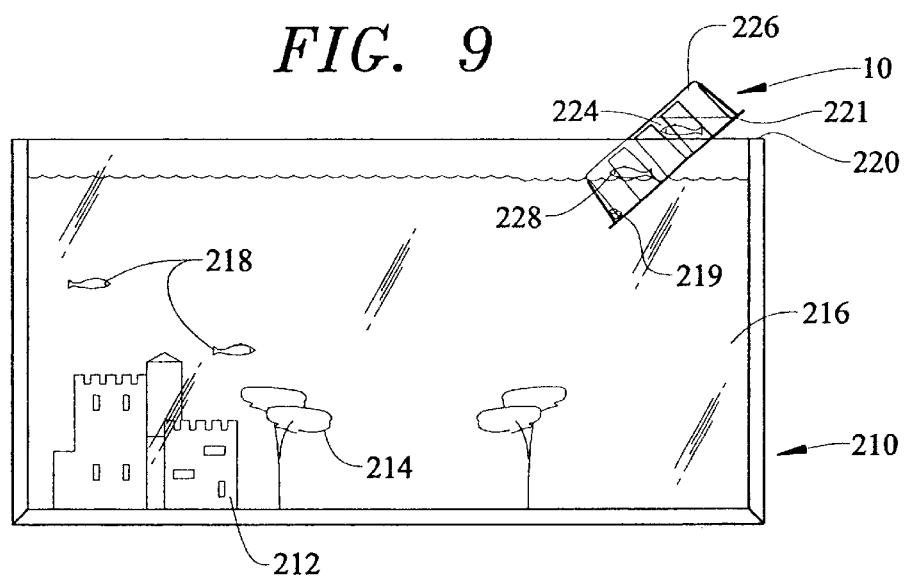
FIG. 9 is a pictorial view of the container being inserted into a aquarium for acclimatization.
Figure 10:
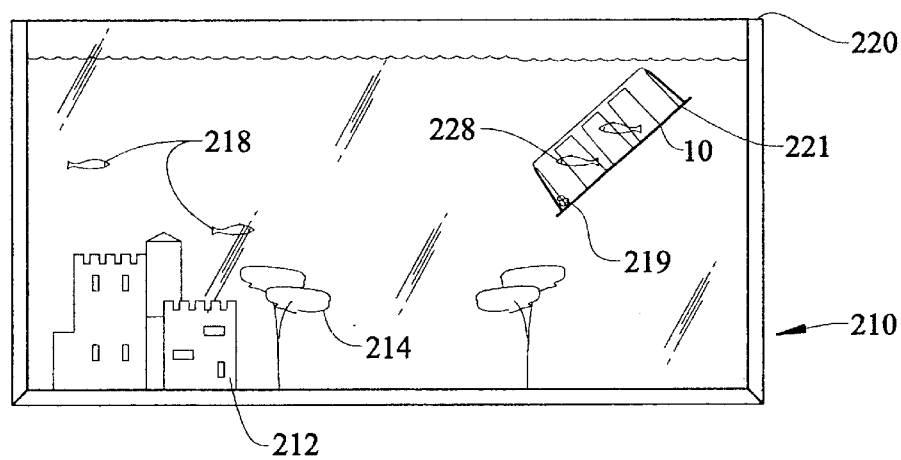
FIG. 10 is a pictorial view of the container partially submerged in an aquarium.

By way of illustration, FIGS. 9 and 10 depict an aquarium 210 having various items such as structures 212 and trees 214, typically found in an aquarium setting, positioned in the water 216 together with any residing fish 218. In this embodiment, coins 219 are placed in the container through slots 221, the coins 219 falling to the corner of the container. The container 10 is placed at the top 220 of the aquarium 210 and designed to sink by use of the coins, which act as weights, or by any of the previously mentioned weights. The water 224 that held the fish in the container is admixed with the water 216 in the aquarium, the container slowing sinking by displacement of the air 226 through the now open slot 221. FIG. 10 depicting the container 10 having the air displaced so as to provide at least partial sinking of the container providing an absolute indicator that fluid admixing is complete. The container will not sink completely due to trapped air and the inherent buoyancy of plastic. The lid 28 of the container 10 can then be punctured or removed allowing the fish 228 to enter their new environment, which is now the same as the water within the container.

Figure 11:
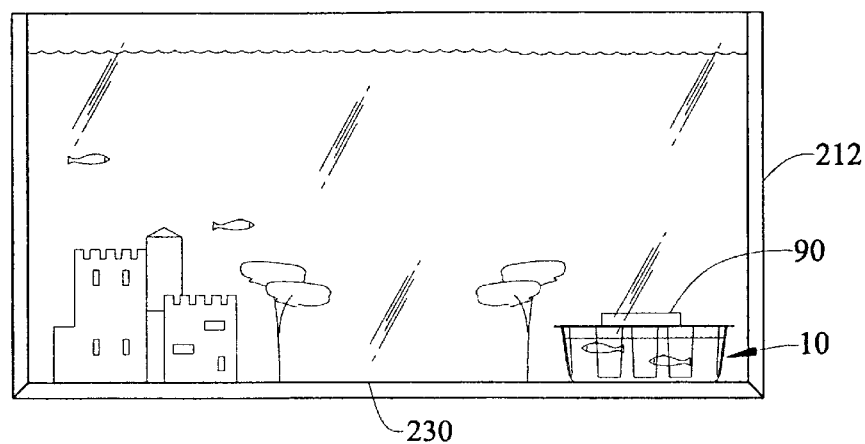
FIG. 11 is a pictorial view of the container fully submerged in an aquarium.

FIG. 11 illustrates yet another embodiment wherein the container 10 is placed along the bottom 230 of the aquarium 210. A weight, such as a stone or small brick 90 is placed on top of the container wherein the fluid transfer admixes in the format previously described. Alternatively, the container may be secured beneath the water by use of an attachment strap wherein one strap is secured to the container and the second end secured to the aquarium. Temperature moderation occurs by conduction through the walls of the container allowing the water to equalize slowly.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A method for storing, transporting, displaying and acclimating marine life comprising the steps of:

partly filling a container, which is provided with a weight therein, and said container defined by a bottom and contiguous side walls with a predetermined amount of water resulting in an air space between the surface of said water and the top off said side walls;

placing marine life in said container;

sealing said container above the said air space;

temporarily storing said marine life in said container for a period of time;

transporting said container to a destination;

providing a water filled aquarium at said destination, said aquarium being larger than said container;

puncturing said container at a restricted opening;

placing said container on top of said aquarium water;

floating said container in said aquarium;

slowly sinking said container in said aquarium over an extended period of time by permitting a predetermined intake of water to displace the air from said space;

simultaneously mixing said aquarium water and said water from said container as said container slowly sinks; and wherein said sealed container provides sufficient oxygen for storing of said marine life, said sealed container providing sufficient rigidity for transporting and display of said fish, whereby the mixing of said aquarium water and said container water at a predetermined fluid exchange rate allows for acclimating of the marine life.

2. The method for storing, transporting, display and acclimating marine life according to claim 1 providing said container with indicia for indicating the required amount of air space.

3. The method for storing, transporting, display and acclimating marine life according to claim 1 providing said container with indicia for indicating a predetermined puncture area for water insertion and air displacement.

4. The method for storing, transporting, display and acclimating marine life according to claim 1 filling said air space with oxygen.

5. The method for storing, transporting, display and acclimating marine life according to claim 1 filling said air space with a mixture of oxygen and ozone.

6. The method for storing, transporting, display and acclimating marine life according to claim 1 providing said container with a weight.

7. The method for storing, transporting, display and acclimating marine life according to claim 6 forming said weight integral with said container.

8. The method for storing, transporting, display and acclimating marine life according to claim 1 forming said weight as an aquarium ornamental object.

9. The method for storing, transporting, display and acclimating marine life according to claim 1 forming said weight of fish food.

10. The method for storing, transporting, display and acclimating marine life according to claim 1 providing said container with an aperture to allow said container to hang in a vertical position.

11. The method for storing, transporting, display and acclimating marine life according to claim 1 forming said weight from coins.

12. The method for storing, transporting, display and acclimating marine life according to claim 1 unsealing said container after mixing of said container water and said aquarium water to release the marine life into said aquarium.

* * * * *